US008483245B2

(12) United States Patent
Madhavan et al.

(10) Patent No.: US 8,483,245 B2
(45) Date of Patent: Jul. 9, 2013

(54) MULTI-TONE DETECTION FOR IN-BAND DATA MODEM LINK ESTABLISHMENT IN WIRELESS NETWORKS

(75) Inventors: Sethu K. Madhavan, Canton, MI (US); Cem U Saraydar, Royal Oak, MI (US); Ki Hak Yi, Windsor (CA)

(73) Assignees: General Motors LLC, Detroit, MI (US); GM Global Technology Operations LLC, Detroit, MI (US)

( * ) Notice: Subject to any disclaimer, the term of this patent is extended or adjusted under 35 U.S.C. 154(b) by 356 days.

(21) Appl. No.: 12/847,934

(22) Filed: Jul. 30, 2010

(65) Prior Publication Data

US 2012/0028681 A1 Feb. 2, 2012

(51) Int. Cl.
*H04J 3/12* (2006.01)

(52) U.S. Cl.
USPC .......... 370/525

(58) Field of Classification Search
None
See application file for complete search history.

(56) References Cited

U.S. PATENT DOCUMENTS

| | | | | |
|---|---|---|---|---|
| 5,666,366 | A * | 9/1997 | Malek et al. | 370/505 |
| 7,983,310 | B2 * | 7/2011 | Hirano et al. | 370/525 |
| 2008/0273644 | A1 * | 11/2008 | Chesnutt et al. | 375/370 |
| 2009/0117947 | A1 * | 5/2009 | Birmingham | 455/569.2 |
| 2010/0067565 | A1 * | 3/2010 | Hirano et al. | 375/219 |
| 2011/0125488 | A1 * | 5/2011 | Birmingham | 704/201 |
| 2011/0164574 | A1 * | 7/2011 | Rao et al. | 370/329 |

* cited by examiner

*Primary Examiner* — Clemence Han
(74) *Attorney, Agent, or Firm* — Anthony Luke Simon; Reising Ethington P.C.

(57) ABSTRACT

A method and system for modem signaling over a voice channel of a cellular or other wireless communication system. A plurality of sequential tones are transmitted, each of which corresponds to at least one network type and contains at least one primary frequency selected so as to successfully be passed through its associated network type. This permits the use of modem signaling to establish a data connection regardless of the type of network equipment utilized, so that the method will work with both newer and older generation vocoders and other network equipment.

10 Claims, 2 Drawing Sheets

MULTI-TONE DETECTION FOR IN-BAND DATA MODEM LINK ESTABLISHMENT IN WIRELESS NETWORKS

TECHNICAL FIELD

The present invention relates generally to data communication over a telecommunications network and, more particularly, to modem signaling over a voice channel of a wireless communication system such as a CDMA or GSM cellular system.

BACKGROUND OF THE INVENTION

Wireless cellular telephony systems enable voice communication between remotely located persons. They have other uses as well; for example, to permit communication with vehicles equipped with a telematics unit that includes an embedded cellular phone. This permits voice communication between the driver and an advisor at a call center, which can be used to provide various vehicle telematics services, as is known in the art. The voice communication capability provided by the wireless carrier system involves the use of a voice channel that uses vocoders on either side of the wireless transmission to compress the speech in an effort to minimize the amount of data that must be transferred wirelessly.

Digital data communication can also be carried out over this voice channel; and this is done using modems at each end of the connection. The modems are designed to establish a data connection over the voice channel by sending modem signaling tones that are recognized by the receiving modem. However, those signaling tones also pass through the vocoder which may attenuate or even completely eliminate the tones, thereby preventing the desired data connection from being established. This problem is further exacerbated by the existence of different types of vocoders that may use different codecs for compression of the received audio input.

SUMMARY OF THE INVENTION

In accordance with an embodiment of the invention, there is provided a method of communicating with a modem via a voice channel of a wireless communication system. The method includes the steps of: (a) generating a plurality of tones corresponding to a plurality of wireless network types, wherein each tone is associated with at least one of the wireless network types and contains at least one sinusoidal frequency component capable of being passed through the associated wireless network type(s); and (b) signaling a remote modem over a voice channel by sending the plurality of tones sequentially to the remote modem via one or more wireless carrier systems, each wireless carrier system being at least one of the wireless network types.

In accordance with another embodiment of the invention, there is provided a method of communicating between a vehicle and call center via a voice channel of a wireless communication system. The method includes the steps of: (a) establishing a voice channel connection between a call center and a telematics unit in a vehicle via a wireless cellular network; (b) generating a sequence of tones, including at least one tone having a first frequency in the range of either 200-850 Hz or 1400-1750 Hz and at least one other tone having a second frequency that is above the first frequency, wherein the sequence of tones includes at least some tones at said second frequency interspersed between tones at said first frequency; and (c) sending the sequence of tones over the voice channel connection.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE PREFERRED EMBODIMENT(S)

The method and system disclosed herein can be used for modem signaling between a mobile device, such as a vehicle telematics unit, and a remote device, such as a call center modem, and is particularly useful in establishing data communication sessions between the mobile and remote device over a voice channel of a wireless communication system such as a CDMA or GSM cellular network. When used for vehicle communications, this permits a regular voice channel connection to be used for data transmission between the vehicle and a remote facility such as a call center.

Figure 1:
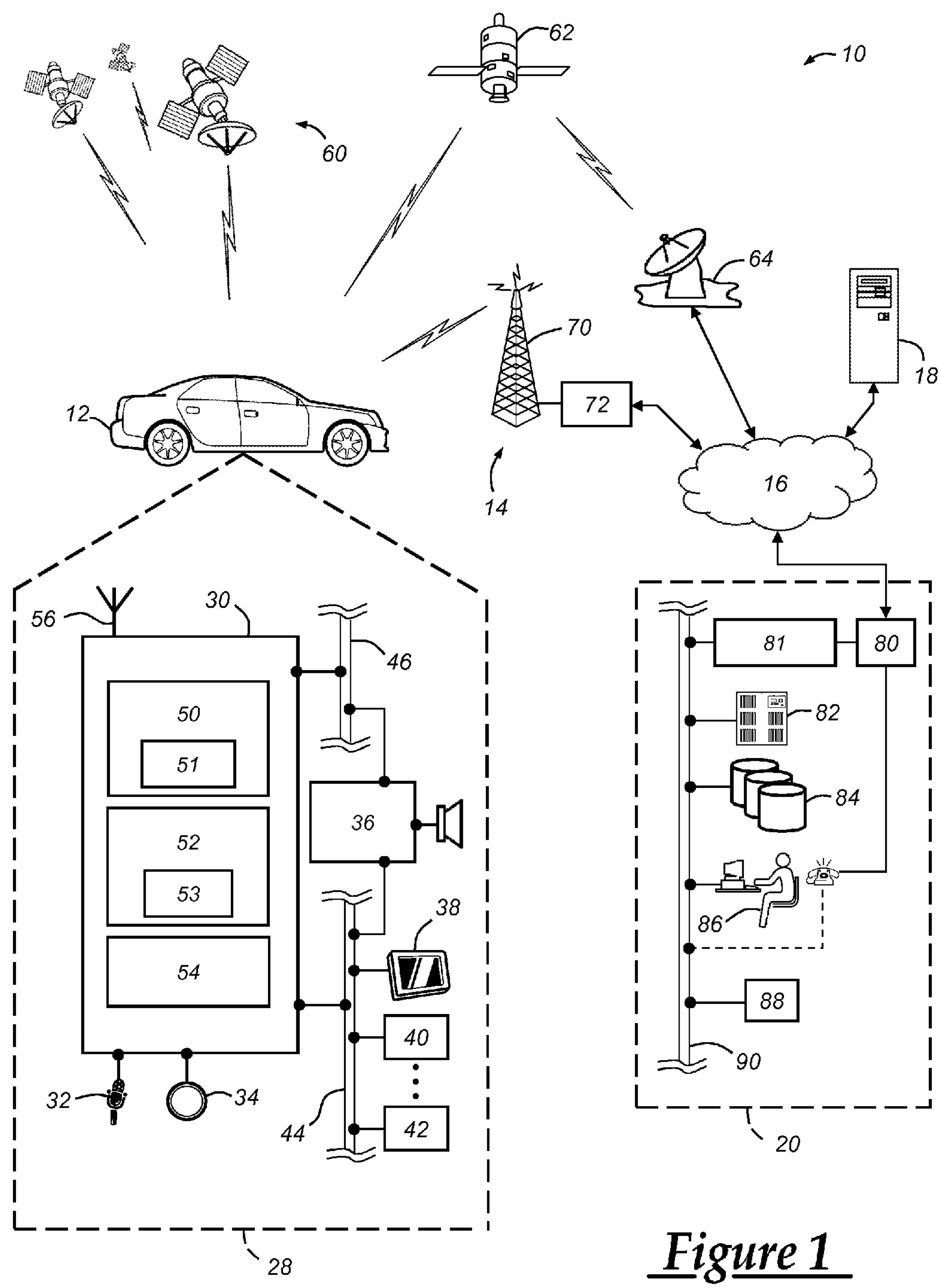
FIG. 1 is a block diagram depicting an exemplary embodiment of a communications system that is capable of utilizing the method disclosed herein.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 is an OEM-installed device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel)

with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem 53 for data transmission, an electronic processing device 52, one or more digital memory devices 54, and a dual antenna 56. It should be appreciated that the modem 53 can either be implemented as shown through software that is stored in the telematics unit and is executed by processor 52, or it can be a separate hardware component located internal or external to telematics unit 30. The modem 53 can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Although a single wireless carrier system, or network, is shown in FIG. 1, it will be appreciated that operation of wireless cellular communications often involve more than one carrier; that is, more than one proprietary network. Roaming agreements and suitable infrastructure are in place in most countries to permit communication between, for example, the call center 20 and telematics unit 30 via any of a number of different networks or via a combination of two or more networks, such as where the call center is connected to a first network carrier (e.g., Verizon™) and the vehicle telematics unit is currently registered on another network (e.g., AT&T™).

Apart from using one or more wireless carrier systems 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem 81 connected between the switch 80 and network 90. Data transmissions are passed via the modem 81 to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Modem Signaling and Data Communication Over a Voice Channel

As noted above, the vehicle 12 and call center 20 can exchange data via a data connection over the wireless communication system 14. Where a wireless cellular network is used, this data communication can be done in various ways, such as via packetized data using technologies supported by the cellular network, or via a cellular voice channel using the modems 53, 81 carried onboard the vehicle and in the call center. Where modem communication over a voice channel is used, the data is sent from the vehicle using a vocoder 51 that can be included in the cellular chipset 50, and is sent from the call center using a vocoder (not shown) in the base equipment at the cell tower 70. Nominally, the vocoders are used to encode voice data (speech) from both the vehicle occupant (not shown) and the live advisor 86 or VRS 88 to compress the speech prior to wireless transmission over the voice traffic channel. Once received over the wireless network, the encoded speech is then decoded by the other vocoder for the listener. Although various compression codecs can be used, in the illustrated embodiment, an EVRC-B vocoder is used.

In addition to the typical voice data transmission over the voice traffic channel, the communication system 10 enables data communication via this same voice traffic channel and through the vocoders. This is accomplished using a modem 53, 81 on either side of the vocoder; that is, using the first modem 53 incorporated into the onboard vehicle telematics unit 30 and the second modem 81 located at the call center 20. These modems can have the same construction and operation so that only modem 53 will be described, and it will be appreciated that the description of modem 53 can apply equally to modem 81. When establishing data communications between the modems 53, 81 over a cellular voice channel, modem signaling tones are often used so that a receiving modem will realize that there is a sending modem attempting communication. These tones can have a specific frequency which is known by the receiving modem. Due to the use of vocoders to compress voice channel communications and eliminate non-speech components of the transmitted audio, the modem signaling tones may be undesirably attenuated or removed by the vocoder. For example, in an EVRC-B vocoder, a 2225 Hz signaling tone may be either substantially filtered out or result in the vocoder being set at a relatively low data rate that is undesirable for the intended data communication. And this result may differ from one wireless network type to another; that is, from one wireless carrier system 14 to another, and/or from one type of network equipment to another. As one example, different generations of vocoders, such as an EVRC-A versus an EVRC-B vocoder can produce different results when presented with the same modem signaling tone. Thus, for example, one wireless network type might attenuate the 2225 Hz tone to the extent that the receiving modem does not respond to it, another might respond with an undesirably low data rate, and another might not interfere with the modem signaling at all.

Figure 2:
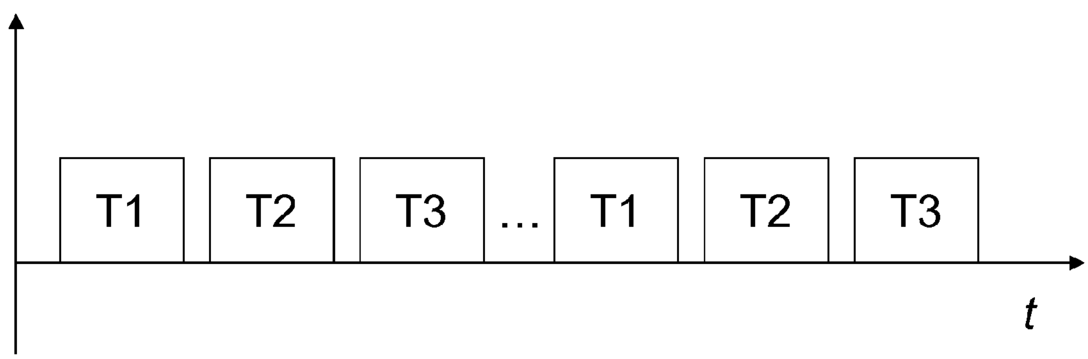
FIG. 2 depicts a composite signal that can be used for modem signaling in the communications system of FIG. 1.

To help avoid these problems and uncertainty in signaling between the modems 53, 81, one or both modems can use a plurality of spaced tones of different primary or center frequencies as a modem signaling carrier, with the different tones each being associated with one of the different network types. This is shown in FIG. 2 where a group of three successive tones (T1-T3) are repeated as long as necessary to successfully signal the other modem or until a failure is declared.

The actual number of different tones can be more or less than three. For example, testing of an EVRC-B network has shown that using two tones, 2225 Hz and 700 Hz in alternating fashion with an 2 sec/240 ms ON/OFF cadence was successful for modem signaling. Other tones have been found to work, for example, rather than the 700 Hz, other tones in the range of 200-850 Hz (at 50 Hz increments) and 1400-1750 Hz (at 50 Hz increments) ranges also worked (i.e., were successfully detected by the network). Additional tones can be included in this sequence to accommodate other types of network equipment such as older vocoders, and as newer vocoders come into use, the modems can be updated (e.g., by re-programming) to add additional tones to accommodate those newer generation vocoders. Such programming of the modems 81 in the call center 20 data modem bank can be done on-site. For the vehicle telematics units, where the modem 53 is implemented in software using the processor 52, those modems 53 can be programmed during a dealership visit or by remote programming wherein the new tone generation routines are uploaded to the vehicle via the modem 53, after which its operation is ceased and the new programming put into place and the modem restarted when appropriate.

As will be appreciated, although some of the tones may be filtered or otherwise attenuated, at least one tone is included that is designed to successfully signal the receiving modem. The use of the different tones for signaling can be implemented in various ways, one such way being shown in FIG. 2 wherein the plurality of tones are arranged temporally. As shown, the tones are spaced temporally with a gap duration and tone duration such that the each tone may be individually received by the wireless carrier system 14. This temporal arrangement may comprise tones arranged as according to a cadence where each tone is separated from another by some substantially systematic, repeatable gap. As noted above, in an exemplary embodiment, this gap may be 240 milliseconds in length, separating tones of 2 seconds in length. In another embodiment, this temporal arrangement of tones may comprise tones arranged intermittently, wherein each tone is separated from another by some variable gap, placed at varying phases for varying lengths of time. In yet another embodiment, this temporal arrangement of tones may comprise tones arranged continuously, where the tones are temporally arranged such that one tone begins as soon as the previous tone ends. Other such implementations will become apparent to those skilled in the art.

In use, the plurality of tones are sent to the wireless carrier system 14 for delivery to a remote modem (53 or 81) across an established voice channel of the wireless carrier system. By design, although one or more of the tones may get suppressed or otherwise attenuated, at least one tone corresponding to the wireless network type (e.g., type of vocoder or other equipment used by the wireless carrier system) will be successfully transmitted through the network to the remote modem, thereby enabling the two modems to set up a data connection over the voice channel. This multi-tone signaling process can be used by one or both modems and, as discussed above, the tones can be specifically selected (for example, by testing) to determine appropriate tones for each network type that permit successful transmission of the tone to the remote (receiving) modem.

One advantage of the above-described approaches to modem signaling is that they can be used not only with currently-existing network types, but also with newly-developing network types and network types that are declining in use. This enables use of the modem with virtually any network type.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the tones may be arranged sequentially, yet at least partially overlapping. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of communicating with a modem via a voice channel of a wireless communication system, comprising the steps of:

generating a plurality of tones corresponding to a plurality of wireless network types, wherein each tone is associated with at least one of the wireless network types and contains at least one sinusoidal frequency component capable of being passed through the associated wireless network type(s); and signaling a remote modem over a voice channel by transmitting the plurality of tones sequentially to the remote modem via one or more wireless carrier systems, each wireless carrier system being at least one of the wireless network types, wherein the sequential transmission is according to a predetermined cadence, wherein each of the plurality of tones has a predetermined tone duration and a predetermined gap duration therebetween.

2. The method set forth in claim 1, wherein the signaling step further comprises repeating the sending of the plurality of tones in an alternating fashion until the remote modem detects at least one of the tones for establishing a data communication link.

3. The method of set forth in claim 1 wherein the tone duration of each of the plurality of tones is at least 2 seconds.

4. A method of communicating between a vehicle and call center via a voice channel of a wireless communication system, comprising the steps of:

establishing a voice channel connection between a call center and a telematics unit in a vehicle via a wireless cellular network;

generating a sequence of tones, including at least one tone having a first frequency in the range of either 200-850 Hz or 1400-1750 Hz and at least two other tones, including a second frequency that is above the first frequency and a third frequency, wherein the sequence of tones includes groups of at least three individual, temporally spaced tones each having a different one of said first, second, and third frequencies; and repeatedly sending the sequence of tones over the voice channel connection until the recipient detects at least one of the tones for establishing a data communication link.

5. The method set forth in claim 4, wherein each frequency corresponds to at least one wireless network type.

6. The method set forth in claim 4, wherein said generating step further comprises generating the sequence of tones such that there is a gap between adjacent tones.

7. The method set forth in claim 6, wherein a duration of the gap is repeatable.

8. A method of communicating with a modem via a voice channel of a wireless communication system, comprising the steps of:

generating a plurality of tones corresponding to a plurality of wireless network types, wherein each tone is associated with at least one of the wireless network types and contains at least one sinusoidal frequency component capable of being passed through the associated wireless network type(s); and signaling a remote modem over a voice channel by sending the plurality of tones sequentially to the remote modem via one or more wireless carrier systems, each wireless carrier system being at least one of the wireless network types, wherein the plurality of tones are arranged according to a predetermined cadence of tones, the tones being separated having a repeatable gap, wherein each of the plurality of tones have a tone duration of at least 2 seconds.

9. The method set forth in claim 8, wherein a duration of the repeatable gap is 240 ms.

10. The method set forth in claim 8, wherein the gap duration varies.

* * * * *